(12) United States Patent
Wakitani et al.

(10) Patent No.: US 7,581,865 B2
(45) Date of Patent: Sep. 1, 2009

(54) LIGHT GUIDE PLATE, PANEL LIGHT-EMITTING STRUCTURE AND DISK DRIVE

(75) Inventors: Noboru Wakitani, Kyoto (JP); Junji Takamoto, Kyoto (JP); Yasuhisa Kitano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 279 days.

(21) Appl. No.: 11/714,891

(22) Filed: Mar. 7, 2007

(65) Prior Publication Data

US 2008/0101090 A1  May 1, 2008

(30) Foreign Application Priority Data

Oct. 30, 2006  (JP) ............................. 2006-293934

(51) Int. Cl.
*F21V 7/04* (2006.01)
(52) U.S. Cl. ...................................... 362/602; 362/616
(58) Field of Classification Search ................. 362/615, 362/253, 628, 600, 602–605, 616, 621, 612, 362/613; 720/601, 646, 647
See application file for complete search history.

(56) References Cited

U.S. PATENT DOCUMENTS

| | | | | |
|---|---|---|---|---|
| 4,760,502 A | * | 7/1988 | Ackeret | 362/86 |
| 5,477,432 A | * | 12/1995 | Magic et al. | 362/26 |
| 6,431,718 B1 | * | 8/2002 | Gamble et al. | 362/85 |
| 7,198,379 B2 | * | 4/2007 | Ishibashi | 362/30 |
| 7,226,200 B2 | * | 6/2007 | Tsai | 362/616 |
| 7,290,268 B2 | * | 10/2007 | Hoshino | 720/601 |
| 7,334,237 B2 | * | 2/2008 | Hoshino | 720/601 |
| 7,380,952 B2 | * | 6/2008 | Miyamoto | 362/26 |

FOREIGN PATENT DOCUMENTS

JP  2001-028203  1/2001

* cited by examiner

*Primary Examiner*—Bao Q Truong
(74) *Attorney, Agent, or Firm*—Nixon & Vanderhye P.C.

(57) ABSTRACT

A panel light-emitting structure includes a front panel, a light guide plate, a light-emitting portion, a guide, etc. The light guide plate is formed in a transversely elongated shape having a long side and a short side, and includes an elongated hole extending in a direction of the long side. This forms two light transmission areas. A notch is provided outside the elongated hole at the short side section. This enables an incident light from an LED to the light transmission areas. An outer surface of the light guide plate is formed by an R curved surface. Accordingly, almost all of the light from the LED is totally reflected by the outer surface.

14 Claims, 7 Drawing Sheets

(A) TOP SURFACE (FRONT SURFACE)

(B) BOTTOM SURFACE (REAR SURFACE)

(C) SIDE SURFACE (BOTTOM SURFACE)

(D) CROSS SECTION

LIGHT GUIDE PLATE, PANEL LIGHT-EMITTING STRUCTURE AND DISK DRIVE

CROSS REFERENCE OF RELATED APPLICATION

The disclosure of Japanese Patent Application No. 2006-293934 is incorporated herein by reference.

BACKGROUND

1. Field

Non-limiting example embodiments of the present invention relate to a light guide plate, a panel light-emitting structure, and a disk drive. More specifically, a non-limiting example embodiment of the present invention relates to a light guide plate, a panel light-emitting structure, and a disk drive utilized for a panel portion furnished with a disk slot.

2. Description of the Related Art

One example of the related art is disclosed in Japanese Patent Laying-open No. 2001-28203 [F21V 8/00, G02B 6/00, G02F 1/13357] (Document 1) laid-open on Jan. 30, 2001. A surface light-emitting device in Document 1 is utilized for a backlight of a liquid crystal display, for example, and includes a planar light guide plate formed in a substantially rectangular shape having a reflection layer on the bottom surface and a light emitting surface on the top surface. On one surface of the light guide plate, a light diffuse portion is formed for diffusing a light incident from an LED light source within the light guide plate. The light diffuse portion is constituted by a plurality of notches each taking a shape of a triangular pyramid, or the like so as to be recessed into the light guide plate. Each notch is formed by taking a point apart from the light emitting surface as a vertex. Thus, a light from the LED light source is never directly emitted from the light emitting surface. Furthermore, each notch has an inclined surface so as to be wider toward the bottom surface, so that the light from the LED light source is diffused, deflected toward the bottom surface of the light guide plate, and then guided to the reflection layer. This makes it possible to realize an efficient light emission.

However, in the technique described in Document 1, at the end section of the LED light source of the light guide plate, an incident angle of the light directed from the LED light source to the side surface of the light guide plate is not above a critical angle, so that it is remarkably dark at the end.

Furthermore, in Document 1, an idea for irradiating the neighbor of a disk loading slot of a disk drive and the concept therefore are not mentioned.

SUMMARY

One light guide plate embodying a non-limiting example embodiment of the invention may be made of a light-transmittable material, and formed in a transversely elongated shape having a long side and a short side. The light guide plate may make a light from a light source enter from the short side to transmit it to the long side. The light guide plate may comprise two light transmission areas vertically divided into two with which an elongated hole formed to be extended in a direction of the long side is sandwiched, and a light enter portion formed at the short side for guiding the light from the light source to the light transmission area. In addition, the light guide plate may be inclined so as to be narrower toward the short side at least an end section of the short side.

One non-limiting example embodiment of invention is also embodied in a novel disk drive. The disk drive may have a part formed with a disk loading slot taking a shape of an elongated hole and a light guide plate for illuminating a neighbor of the disk loading slot.

The above described features, aspects and advantages of non-limiting example embodiments of the present invention will become more apparent from the following detailed description of non-limiting example embodiments of the present invention when taken in conjunction with the accompanying drawings.

DETAILED DESCRIPTION OF THE NON-LIMITING EXAMPLE EMBODIMENTS

Figure 1:
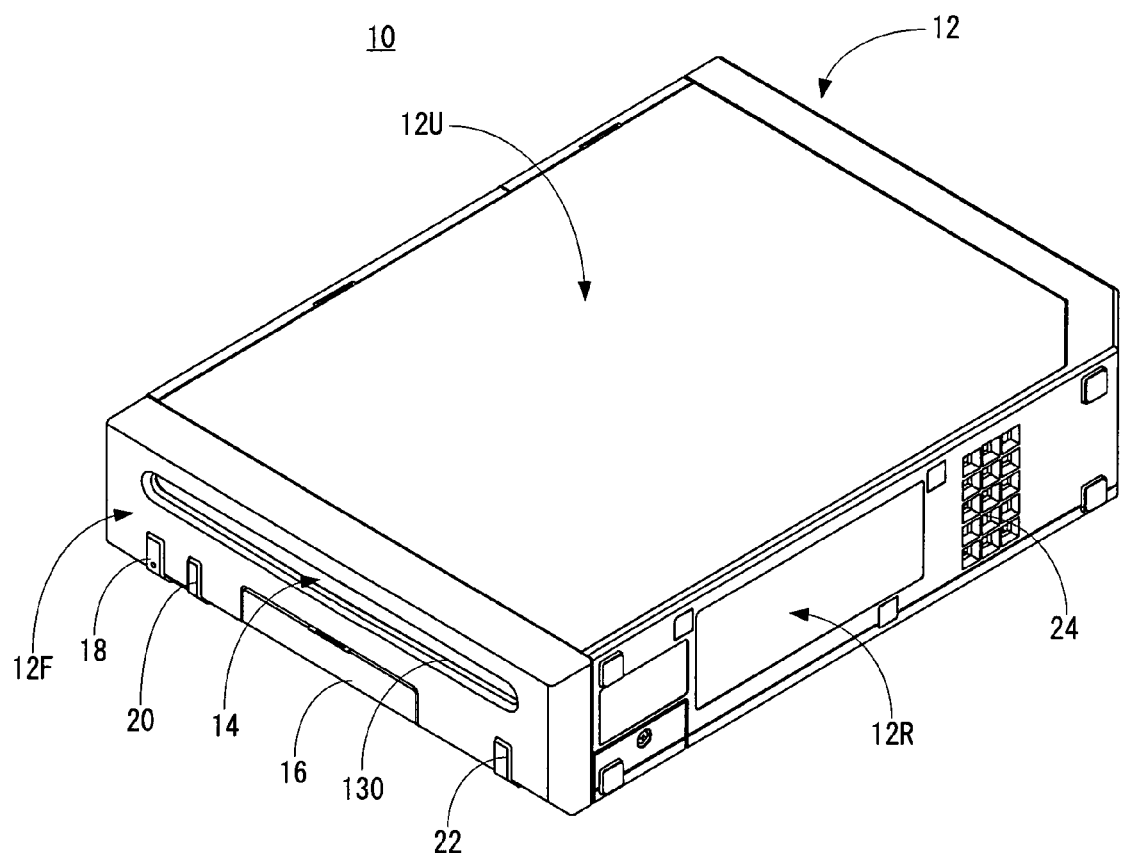
FIG. 1 is a perspective view of one example of a game apparatus to which a panel light-emitting structure of non-limiting example embodiment of the invention is applied as seen from above front.

Referring to FIG. 1, a game apparatus 10 of one non-limiting example embodiment of the present invention includes a substantially rectangular parallelepiped housing 12. As understood by referring to FIG. 1 and FIG. 2, the housing 12 is constituted by a front panel 12F, a back panel 12B, a top panel 12U, a bottom panel (not illustrated), a right side panel 12R, and a left side panel (not illustrated), for example.

It should be noted that the bottom panel not shown is a panel being opposite to the top panel 12U, and similarly, the left side panel not shown is a panel being opposite to the right side panel 12R.

As shown in FIG. 1, on the front panel 12F, a disk slot 14, a SD card slot cover 16, a power button 18, a reset button 20, and a disk eject button 22 are provided. The disk slot 14 takes a shape of an elongated hole. Inside the housing 12, a light guide plate 102 having an elongated hole 130 is provided as described later. A part (all or a part of the inclined surface 130a described later) of the light guide plate 102 is exposed from the disk slot 14, and is arranged inside the front panel 12F such that the disk slot 14 and the elongated hole 130 are overlapped with each other when seen from a loading direction of a disk (not illustrated). Although illustration is omitted, the light guide plate 102 is fixed to the front panel 12F.

Figure 2:
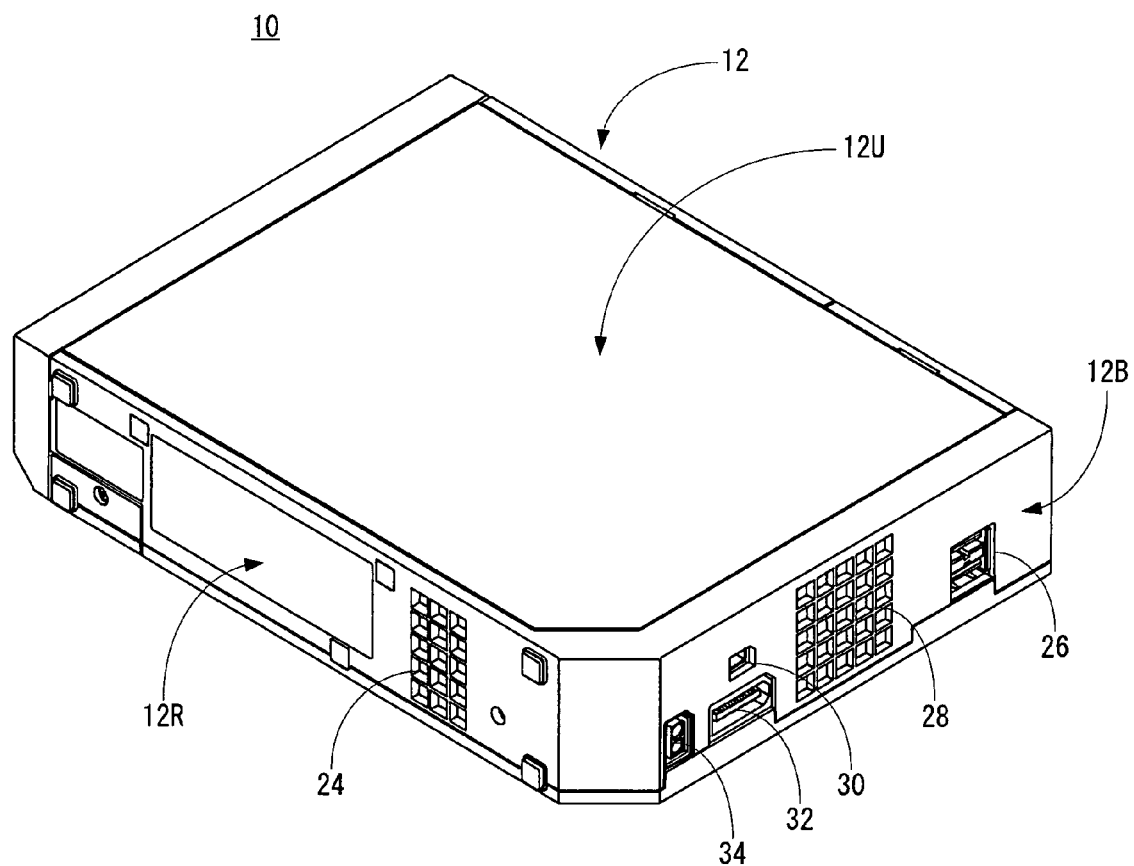
FIG. 2 is a perspective view of the game apparatus shown in FIG. 1 as seen from below rear.

Furthermore, on the right side panel 12R, an inlet hole 24 is formed. Although illustration is omitted, a part of the left side panel has an openable and closeable structure, and when the part thereof is opened, a connector for controller to be connected with a cable is provided. In addition, as shown in FIG. 2, on the back panel 12B, a USB connector 26, an exhaust hole 28, a peripheral connector 30, an AV connector 32, and a power source connector 34 are provided.

Figure 3:
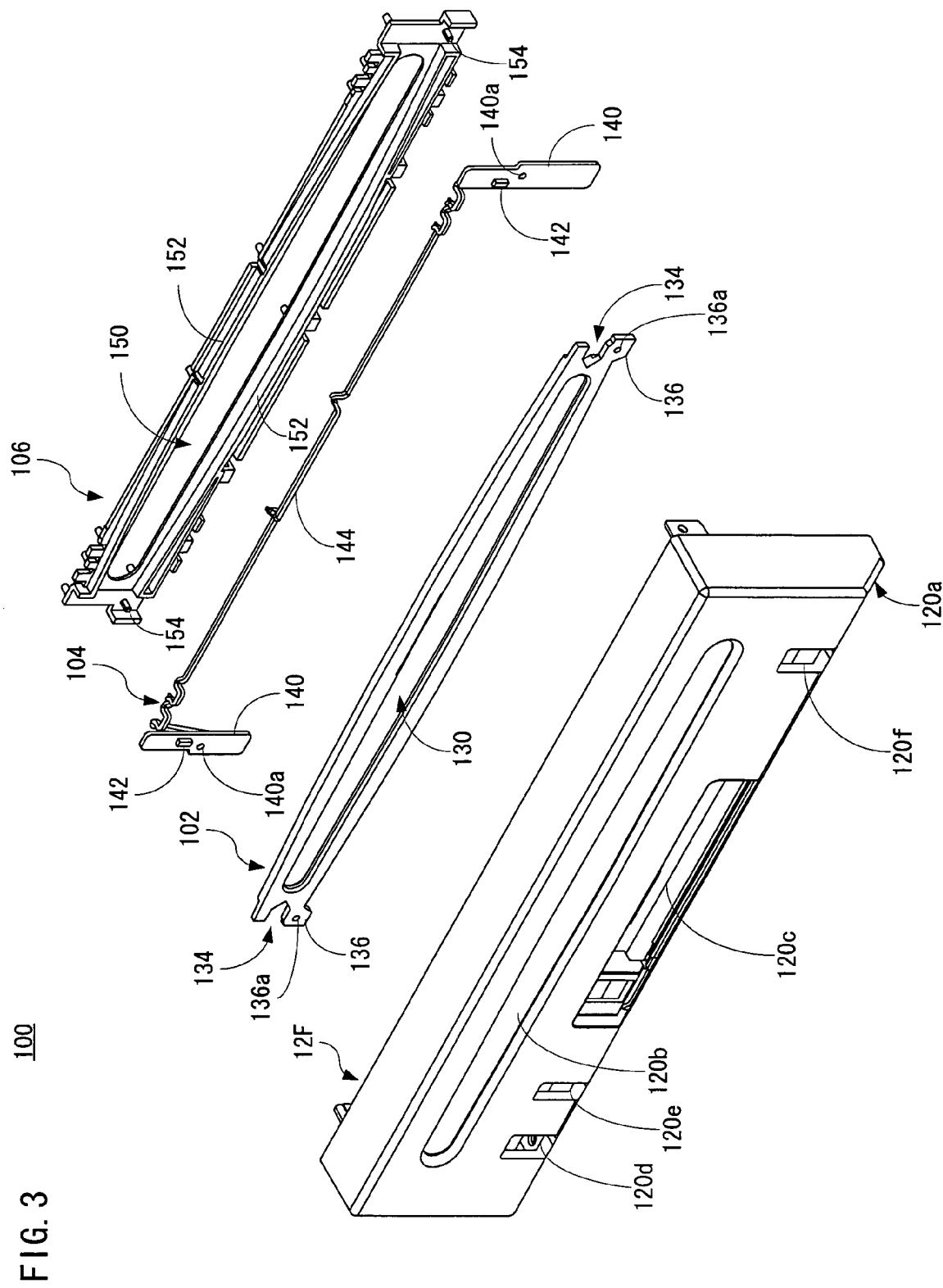
FIG. 3 is an exploded view of a panel light-emitting structure of a non-limiting example embodiment of the invention.

FIG. 3 is an exploded view of a panel light-emitting structure 100 including the front panel 12F. For example, the panel light-emitting structure 100 is constituted by the front panel 12F, the light guide plate 102, a light-emitting portion 104, a guide 106, etc.

The front panel 12F has a rectangular parallelepiped appearance, and has an inclined surface 120a on the side where the above-described SD card slot cover 16, power button 18, reset button 20 and eject button 22 are arranged. Furthermore, on the front panel 12F, an elongated hole 120b forming a part of the disk slot 14 is formed.

Additionally, FIG. 3 shows a state in which the front panel 12F is not attached with the SD card slot cover 16 and the push member such as the respective of the power button 18, the reset button 20, and the eject button 22.

The elongated hole 120b is formed so as to be larger (wider) in a direction of the short side from the end to the center as in an elongated hole 130 of the light guide plate 102 as described later.

In addition, on the front panel 12F, an SD card slot 120c is formed, and holes 120d, 120e and 120f for providing the power button 18, the reset button 20, and the eject button 22 are provided respectively.

The light guide plate 102 is held by the guide 106 together with the light-emitting portion 104, and fixed to the front panel 12F. The light guide plate 102 is made of a light-transmittable material (transparent resin) such as polycarbonate, acrylic, etc. It should be noted that the light-transmittable material is not limited thereto, and a transparent resin, a transparent glass, a transparent ceramic having relatively high transparency, or the like may be utilized.

Figure 4:
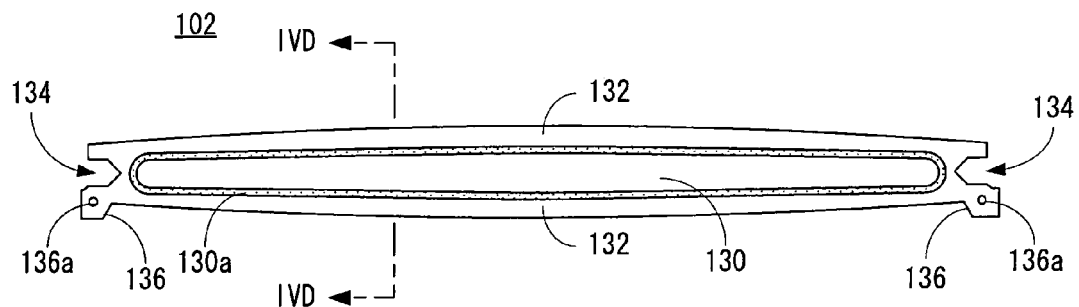
FIG. 4 is an illustrative view showing a light guide plate shown in FIG. 3.
Figure 4:
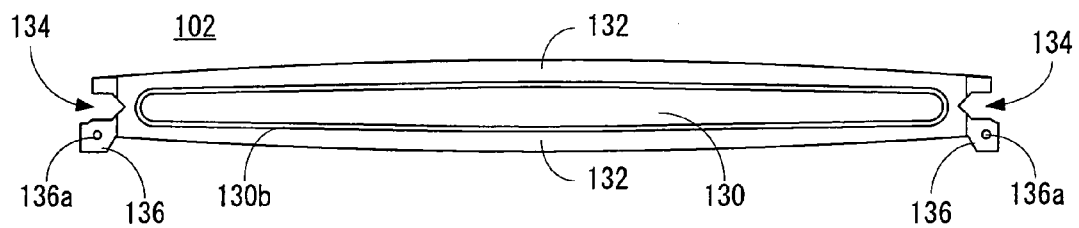
Figure 4:
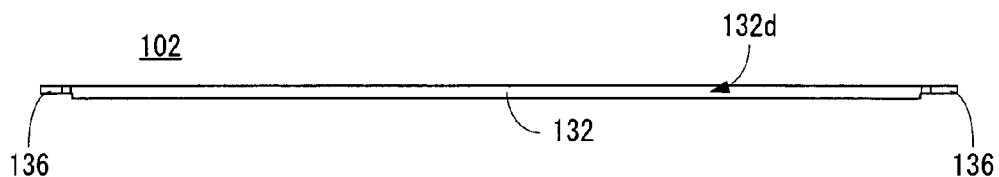
Figure 4:
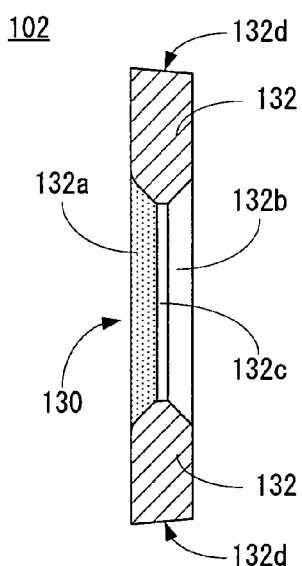

Here, by utilizing FIG. 4(A)-FIG. 4(D), a shape of the light guide plate 102 is described in detail. Additionally, FIG. 4(A) is a top view of the light guide plate 102 as seen from a top surface (front surface), FIG. 4(B) is a bottom view of the light guide plate 102 as seen from a bottom surface (rear surface), FIG. 4(C) is a side view of the light guide plate 102 as seen from a side surface (bottom surface), and FIG. 4(D) is a cross section along the line IVD-IVD shown in FIG. 4(A).

As shown in FIG. 4(A) and FIG. 4(B), the light guide plate 102 is formed in a transversely elongated shape having a long side and a short side. The light guide plate 102 is arranged so as to be overlapped with the above-described disk slot 14, and has an elongated hole 130 extending in the direction of the long side (lengthwise). The elongated hole 130 has a width of the direction of the short side larger (wider) from the end of the lengthwise direction (short side of the light guide plate 102) to the center thereof. This is because that in a case that an optical disk (not illustrated) like a DVD is inserted and removed into and from the disk slot 14, when the optical disk is slanted to the long side of the elongated hole 130, the optical disk is held at the end (both sides) of the elongated hole 130 to thereby prevent the record surface for signal from being damaged.

Furthermore, the light guide plate 102 is formed with light transmission areas 132 divided into two with which the elongated hole 130 is sandwiched. In other words, the provision of the elongated hole 130 causes two vertically divided light transmission areas 132. In this embodiment, the light guide plate 102 is formed such that the long side is narrower from the long side to the short side at the end of the short side. That is, in this embodiment, the light guide plate 102 is the narrowest in width at the short side, and becomes wider toward the center thereof. Thus, the outer periphery surface 132d of the light transmission area 132 is an R curved surface.

Also, in this embodiment, when the light guide plate 102 is divided lengthwise into three sections, the middle thereof is referred to as a central section of the light guide plate 102, and each of the sections adjacent thereof is referred to as an end section of the light guide plate 102.

In addition, to each of the two short sides of the light guide plate 102, a notch 134 as a light enter portion is formed. The notch 134 has a substantially right angle (90°) to allow a light emitted from the LED 142 (see FIG. 3) of the light-emitting portion 104 to be incident to the two light transmission areas 132 approximately equally. In this embodiment, the respective notches 134 are formed such that the angles of the two notches 134 are opposite to each other.

It should be noted that in this embodiment, the notch 134 has a right angle in order to totally reflect a light by the side surface (outer periphery surface 132d) of the light guide plate 102 in the light transmission area 132 as described later, and therefore the angle of the notch 134 is determined in view of an incident angle of the light to the side surface. Accordingly, it should be noted that the angle is an angle obtained by taking the positional relationship between the light guide plate 102 and the LED 142 and an incident angle of a light to the side surface (outer periphery surface 132d) of the light guide plate 102 into consideration.

Furthermore, on the light guide plate 102, a positioning member 136 is formed outside the light transmission area 132. This is because that when the positioning member 136 is provided within the light transmission area 132, nonuniformity in light occurs by the positioning member 136. That is, the positioning member 136 is arranged at a position which does not obstruct an optical path. A description about a light transmission (optical path) is made later. The positioning member 136 is provided with a hole 136a, and when the light guide plate 102 is held by the guide 106 together with the light-emitting portion 104, a protrusion (rib) 154 provided on the guide 106 is fit into the hole 136a.

In addition, as understood from FIG. 4(C), the thickness of the light guide plate 102 is different between the outside and the inside of the light transmission area 132. In the light guide plate 102 of this embodiment, the outside of the light transmission area 132 is thinner in width than the inside thereof. This is because that the thickness of the LED substrate 140 is also included when the light guide plate 102 is held by the guide 106 together with the light-emitting portion 104, and the light from the LED 142 is guided (made incident) to the light transmission area 132 from the central section or substantially central section of the thickness of the light guide plate 102.

In addition, as understood from FIG. 4(D), the inner peripheral surface of the light guide plate 102 formed by the elongated hole 130 is constituted by an inclined surface 132a, an inclined surface 132b, and a planar surface 132c. Although it is difficult to understand from the drawing, a rough finishing is performed on the inclined surface 132a as a light emitting surface, and a mirror finishing is performed on the inclined surface 132b and the planar surface 132c. For example, grains (satins) are formed on the inclined surface 132a. Strictly speaking, a mirror finishing is performed on all the surfaces except for the inclined surface 132a of the light guide plate 102.

Additionally, the light guide plate 102 is held by the guide 106 and fixed with the front panel 12F such that the light emitting surface, that is, the inclined surface 132a (main surface (surface) of the light guide plate 102) faces the front panel 12F. Accordingly, as described above, all or a part of the inclined surface 132a is made visible in an exposed manner (see FIG. 1).

Returning to FIG. 3, the light-emitting portion 104 includes two LED substrates 140, and the LED 142 as a light source is attached to each LED substrate 140. Although it is difficult to understand from the drawing, light emitting surfaces of the two LEDs 142 are opposite to each other. Furthermore, the two LED substrates 140 are connected with an electric wire (lead wire) 144 for supplying power to the LED 142. Although illustration is omitted, an electric wire from the power supply is connected to one of the LED substrate 140 to supply power with the LED 142 attached to each LED substrate 140. It should be noted that in FIG. 3, the electric wire 144 is shown in a state that the light-emitting portion 104 is held (mounted) by the guide 106. In addition, each LED substrate 140 is provided with a hole 140*a*, and when it is held by the guide 106 together with the light guide plate 102, the rib 154 of the guide 106 is fit into the hole 140*a*.

The guide 106 is a holding member for holding the light guide plate 102 and the light-emitting portion 104, and is made of ABS (acrylonitrile/butadiene/styrene) resin. Although it is impossible to understand from the drawing, the guide 106 is white. This is because that the light leaking from the light guide plate 102 is reflected by a wall 152 so as to be returned to the inside of the light guide plate 102 as described later. That is, the guide 106 is only necessary to reflect a light, and thus can be made of metal such as aluminum, stainless steel, or the like.

The guide 106 is provided with an elongated hole 150 having approximately the same shape and size as the elongated hole 130 provided to the light guide plate 102. Outside the elongated hole 150, the wall 152 extending lengthwise is provided. The wall 152 is formed such that the inner surface thereof is brought into contact with the outer periphery surface 132*d* of the light guide plate 102 (light transmission area 132). Strictly speaking, it may be possible that the inner surface of the wall 152 is not brought into contact with the outer periphery surface 132*d* of the light guide plate 102. Accordingly, it may be said that the wall 152 is furnished such that the inner surface thereof covers the outer periphery surface 132*d* of the light guide plate 102. Furthermore, at an end section of the guide 106, the rib 154 is provided. As described above, the rib 154 is fit into the hole 136*a* and the hole 140*a* when the light guide plate 102 and the light-emitting portion 104 are held by the guide 106.

Figure 5:
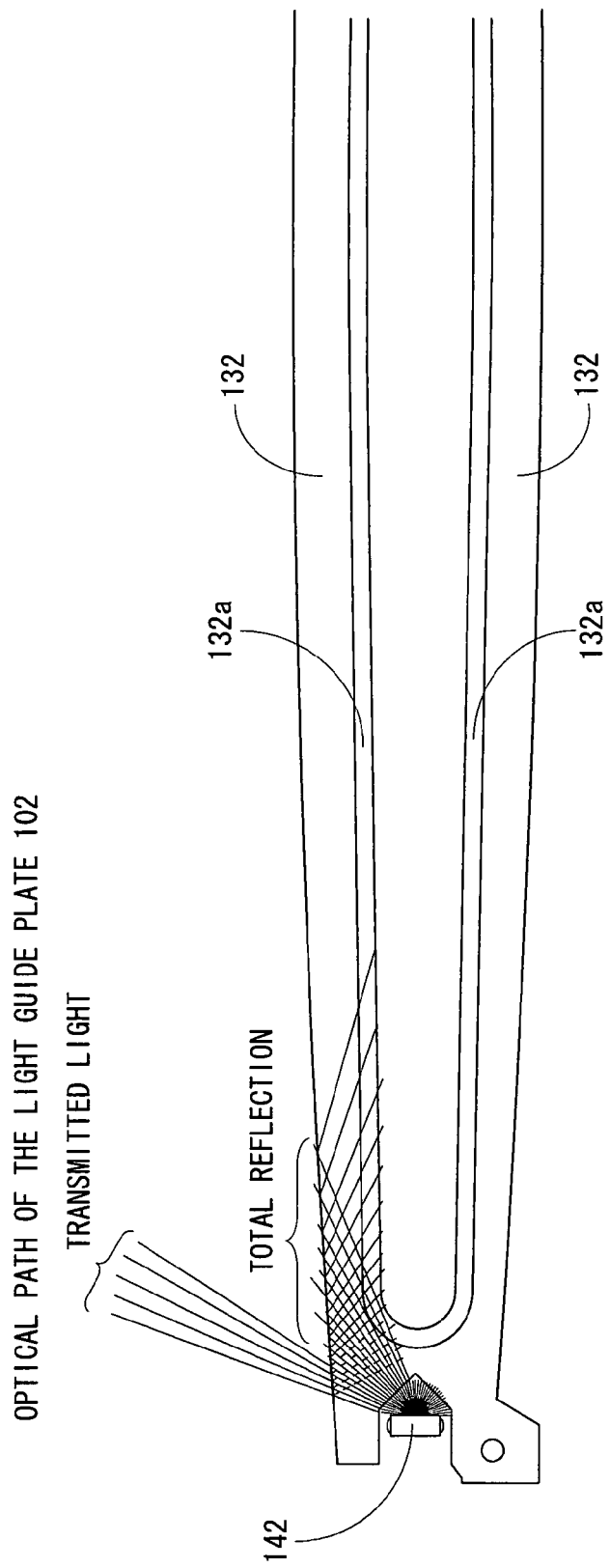
FIG. 5 is an illustrative view showing an optical path of the light guide plate shown in FIG. 3.

In such a panel light-emitting structure 100, when the LED 142 lights up, a light from the LED 142 transmits through the light transmission area 132 as shown in FIG. 5 to make the light transmission area 132 emit a light. Additionally, the inclined surface 132*a* as a light emitting surface glows most brightly. More specifically, a light emitted from the LED 142 is incident from the short side of the light guide plate 102, and divided into two by the notches 134 provided on the short sides so as to be guided to the two light transmission areas 132. At this time, the light quantity guided to the two light transmission areas 132 is made equal or substantially equal.

The light incident to the light transmission area 132 is totally reflected by the outer periphery surface 132*d* of the light guide plate 102 (light transmission area 132), and then irradiated onto the inclined surface 132*a* as a light emitting surface, the inclined surface 132*b*, and planar surface 132*c*. Accordingly, the light emitting surface (inclined surface 132*a*) glows brightly. Although illustration is omitted, the light is totally reflected by the inclined surface 132*b* and the planar surface 132*c*. Thus, the light transmits from the short side to the central section through the light guide plate 102 (light transmission area 132).

Figure 6:
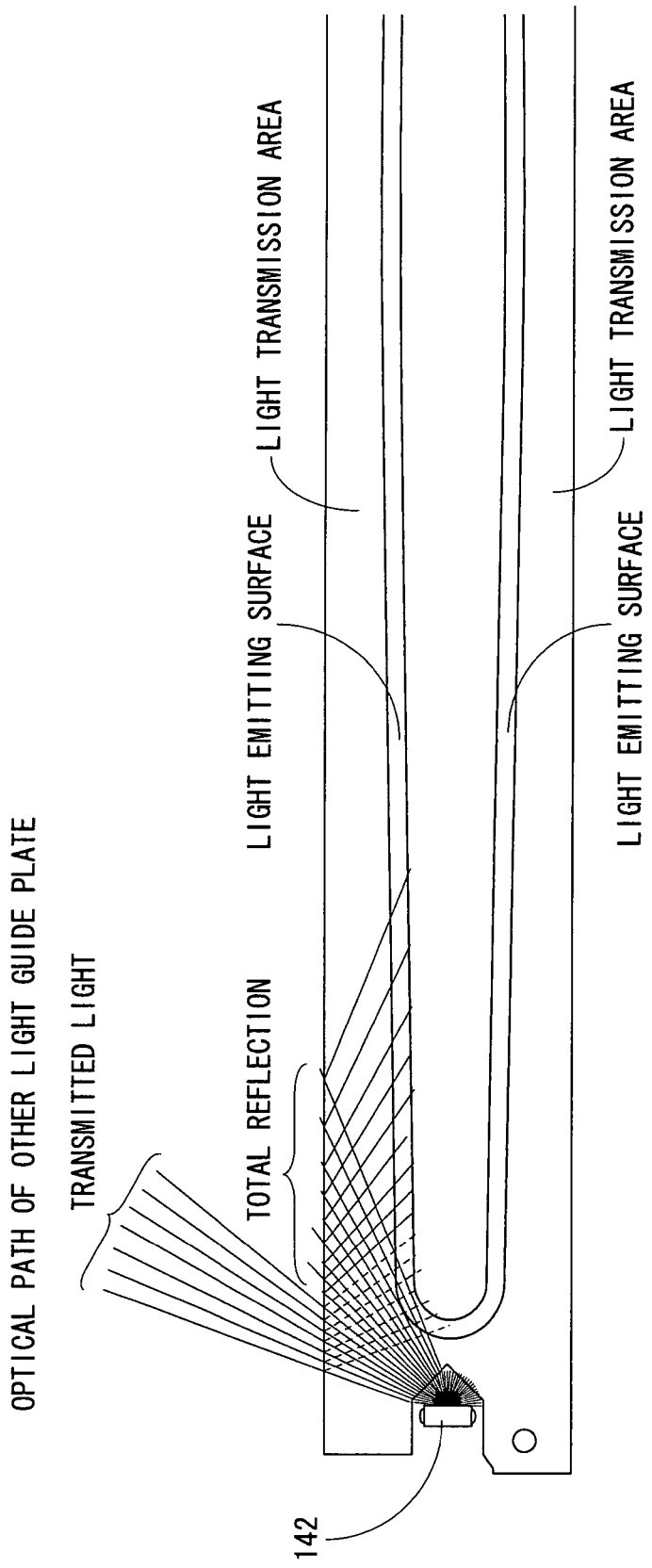
FIG. 6 is an illustrative view showing an optical path of other light guide plate.

However, if a light from the LED 142 is below the critical angle (42°-43°, for example), the light is a transmitted light to thereby pass through the light guide plate 102 (light transmission area 132). Here, a description is made on an optical path in the light transmission area 132 of the light guide plate 102 of this embodiment by utilizing FIG. 5 and FIG. 6. Additionally, FIG. 5 shows the light guide plate 102 of this embodiment and a part of the optical path, and FIG. 6 shows other light guide plate and a part of the optical path. In the light guide plate 102 shown in FIG. 5, the outer periphery surface 132*d* is formed by an R curved surface (curved plane) as described above. On the other hand, in the other light guide plate shown in FIG. 6, the outer surface is formed by a planar surface. Accordingly, the light guide plate 102 shown in FIG. 5 has more amount of light above the critical angle and less transmitted light than that of the light guide plate shown in FIG. 6. That is, the light is totally reflected efficiently. Thus, it is possible to prevent the end section of the light guide plate 102 from becoming dark. Furthermore, it is possible to make effective use of the light incident form the LED 142.

In addition, when the light guide plate 102 is held by the guide 106, the inner surface of the wall 152 of the guide 106 covers at least the outer periphery surface 132*d* of the light guide plate 102 (light transmission area 132). Thus, the transmitted light transmitted from the outer periphery surface 132*d* of the light guide plate 102 is reflected by the inner surface of the wall 152, and is incident to the light guide plate 102 (light transmission area 132) again. In order to heighten reflection efficiency as soon as possible, the guide 106 is made in white as described above. However, all of the guide 106 needs not to be white, and at least the inner surface of the wall 152, that is, the reflecting surface is only necessary to be white. Alternatively, a thin film of metal such as aluminum foil is pasted on the inner surface of the wall 152 to form the reflective surface by the thin film.

According to this embodiment, the long side of the light guide plate is inclined so as to be narrower toward the short side at the end section of the short side of the light guide plate, so that almost all of the light incident from the LED can be totally reflected. That is, it is possible to prevent the end section of the light guide plate from becoming dark, capable of uniformly emitting the light guide plate. The less transmitted light makes it possible to efficiently use a light from the light source. In addition, illuminating the disk slot allows the player to easily understand where to insert a disk.

Additionally, in this embodiment, a description is made only on a case that the panel light-emitting structure is applied to a front panel of an electronic appliance such as a game apparatus, but this is not limited thereto. For example, the panel light-emitting structure can be applied to other electronic appliances, such as a disk drive capable of reproducing a disk medium like CD, DVD, or the like, or a CD player, a DVD player, a stereo system (minicomponent stereos), a computer, etc, furnished with such a disk drive. Also, this can be applied to a medium inserting portion (loading slot) capable of reproducing (loading) other disk medium such a floppy disk (registered trademark), MD, MO, etc. as well as CD and DVD or other recording medium such as a memory card, etc.

Figure 7:
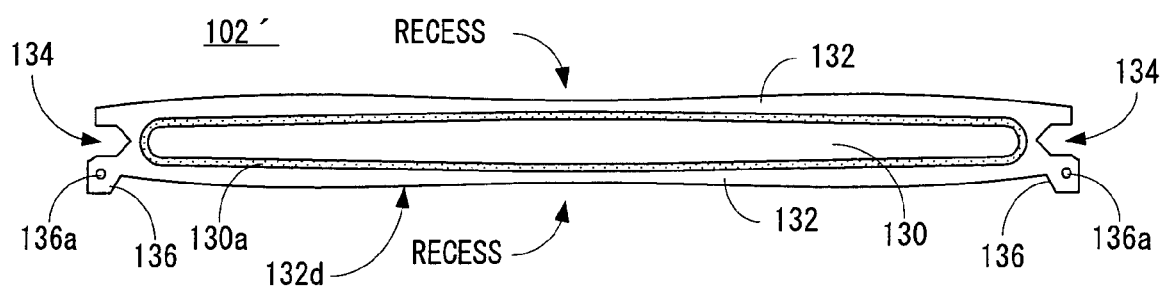
FIG. 7 is an illustrative view showing other example of a light guide plate utilized in the panel light-emitting structure of a non-limiting example embodiment of the invention.

Furthermore, in this embodiment, the outer surface is made to be a curved surface such that its width is wider from the end section of the light guide plate to the central section thereof. However, in such a case, the central section of the light guide plate is slightly darker than the short side thereof. For avoiding this, if a light guide plate 102' shown in FIG. 7 is used, the light guide plate 102' (light emitting surface 132*a*) can uniformly or substantially uniformly emit a light overall. That is, it is possible to improve uniformity of the luminance level.

It should be noted that in FIG. 7, for simplicity, the parts the same as the light guide plate 102 of the above-described embodiment are identified by the same reference numerals.

More specifically, in the light guide plate 102' of other example, an outer periphery surface 132*d* is formed by continuously providing two inclined surfaces different in an inclination direction. In other words, the long side of the light guide plate 102' is inclined such that the width of the light guide plate 102' (light transmission area 132) becomes wider from the short side to the central section, and then continuously inclined in the reverse direction. That is, in the light guide plate 102 of the above-described embodiment, the outer periphery surface 132*d* is formed so as to be smoothly recessed at the central section.

It should be noted that a degree of the inclination is determined (calculated) such that a light is totally reflected as much as possible by any inclined surfaces.

Although illustration is omitted, if the light guide plate 102' is used for the panel light-emitting structure 100, the shape of the wall 152 provided on the guide 106 has to be changed such that it covers the outer periphery surface 132*d* of the light guide plate 102'.

Although non-limiting example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A light guide plate made of a light-transmittable material, and formed in a transversely elongated shape having a long side and a short side for making a light from a light source enter from said short side to transmit it to said long side, comprising:
    two light transmission areas which are vertically divided from each other and with which an elongated hole formed to be extended in a direction of said long side is sandwiched, and
    a light enter portion formed at said short side for guiding the light from said light source to said light transmission area, wherein
    said long side is inclined so as to be narrower toward said short side at least at an end section of said short side.

2. A light guide plate according to claim 1, further comprising a positioning member provided outside said light transmission area.

3. A light guide plate according to claim 1, wherein an inner periphery formed by said elongated hole includes a rough face inclined to a main surface of said light guide plate.

4. A light guide plate according to claim 1, wherein said long side is continuously inclined from said short side so as to be the widest at a central section of said light transmission area.

5. A light guide plate according to claim 1, wherein a recess is formed at a part of said long side.

6. A light guide plate according to claim 1, wherein a width of said elongated hole in a direction of said short side is formed so as to be wider from an end of said elongated hole to a central section thereof.

7. A light guide plate according to claim 1, wherein the transversely elongated shape has another short side and said light enter portion is formed at each of said short sides to allow lights from each of said short sides to enter in said two light transmission areas.

8. A panel light-emitting structure utilizing a light guide plate described in claim 1 comprising:
    a light source for making a light be incident from the short side of said light guide plate, and
    a member for covering at least a part of an outer surface of said light guide plate.

9. A panel light-emitting structure according to claim 8, wherein said member is detachably attached with said light source.

10. A panel light-emitting structure according to claim 8, wherein said member has an engaging portion for engaging a conductor extending from a substrate arranged at one side portion to a substrate arranged at the other side portion.

11. A disk drive comprising:
    a housing formed with a disk loading slot taking a shape of an elongated hole;
    a light guide plate formed with an elongated hole; and
    a light source for causing said light guide plate to emit a light, wherein
    said light guide plate is arranged in said housing such that at least a part thereof is exposed from said disk loading slot, and is arranged at a positional relationship where said elongated hole and said disk loading slot are overlapped with each other when viewed from a disk loading direction.

12. A disk drive according to claim 11, wherein said light source is arranged within said housing, and is at a position which hidden from said disk loading slot.

13. A disk drive comprising:
    a housing formed with a disk loading slot taking a shape of an elongated hole;
    a light guide plate formed with an elongated hole;
    a light source for causing said light guide plate to emit a light, and
    a member detachably attached to said housing, wherein
    said member covers at least a part of an outer surface of said light guide plate, and
    said member is detachably attached with said light guide plate.

14. A disk drive according to claim 13, wherein said member is formed on a face formed with said disk loading slot on said housing, and a part including said face of said housing is constructed separately from the other part.

* * * * *